(No Model.)
J. R. KINKADE.
WAGON BRAKE.
No. 605,551.  Patented June 14, 1898.
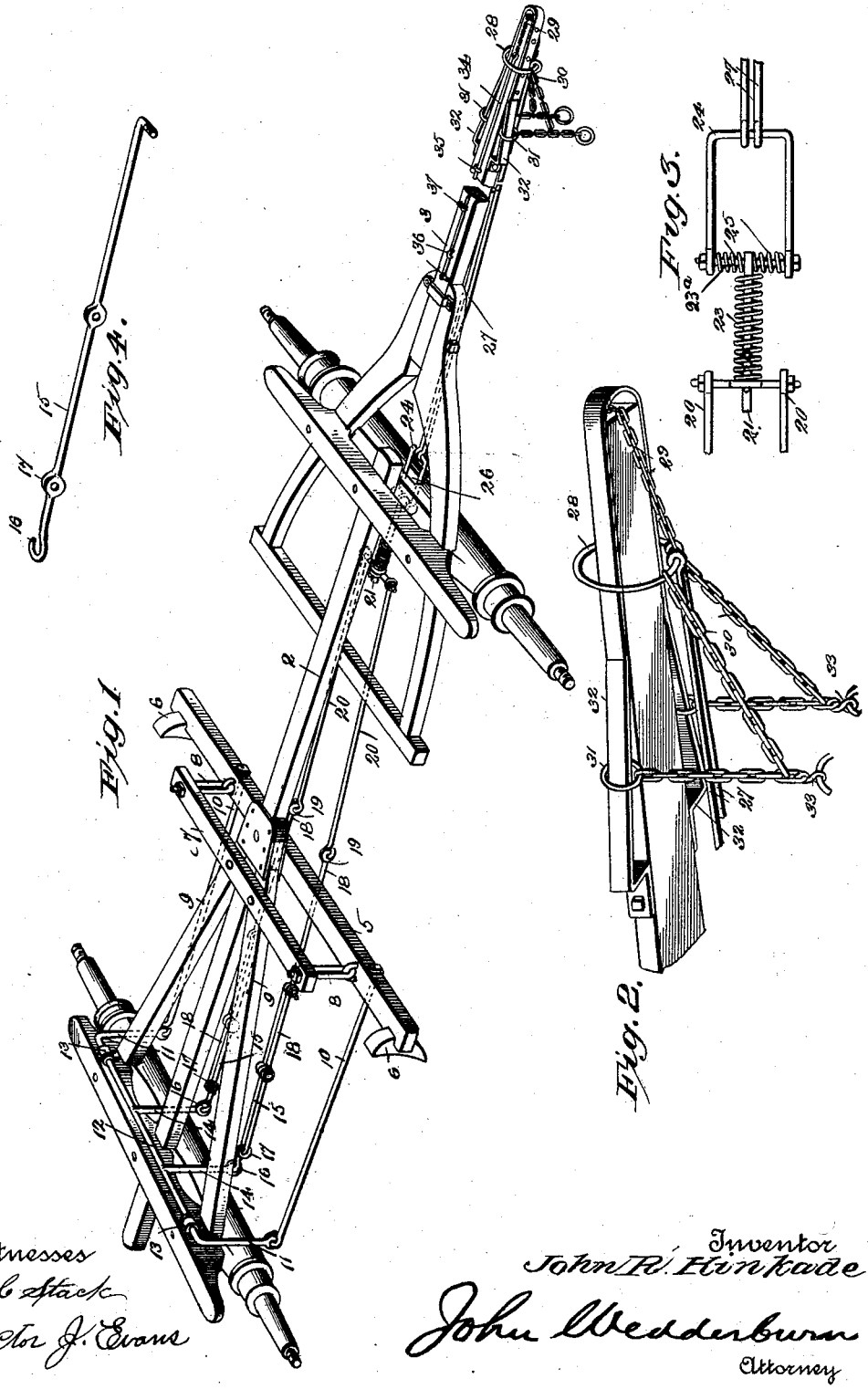
Witnesses
Jos C Stack
Victor J. Evans
Inventor
John R. Kinkade
John Wedderburn
Attorney
THE NORRIS PETERS CO., PHOTO-LITHO., WASHINGTON, D. C.

UNITED STATES PATENT OFFICE.

JOHN R. KINKADE, OF SONORA, KENTUCKY.

WAGON-BRAKE.

SPECIFICATION forming part of Letters Patent No. 605,551, dated June 14, 1898.

Application filed July 26, 1897. Serial No. 645,914. (No model.)

*To all whom it may concern:*

Be it known that I, JOHN R. KINKADE, of Sonora, in the county of Hardin and State of Kentucky, have invented certain new and useful Improvements in Wagon-Brakes; and I do hereby declare the following to be a full, clear, and exact description of the invention, such as will enable others skilled in the art to which it appertains to make and use the same.

This invention relates to wagon-brakes; and it consists, essentially, of an attachment to an ordinary brake to be operated by the animals attached to a vehicle in descending a grade and afterward returned to its normal position by a suitable controlling device.

The invention further consists of the details of construction and arrangement of the several parts, which will be more fully hereinafter described and claimed.

The object of the present invention is to provide automatically-controlled means for actuating a brake and properly applying the same on a grade without requiring the manipulation thereof by a driver or teamster, the parts being simple and effective in their construction and operation, strong and durable, and easily applied in operative position to any vehicle now in use.

In the accompanying drawings, Figure 1 is a perspective view of the running-gear of a wagon, showing the improved form of brake applied thereto. Fig. 2 is a detail perspective view, on an enlarged scale, of the front portion of a wagon-pole, showing an attachment in connection therewith for operating the brake. Figs. 3 and 4 are detail views of parts of the device.

Referring to the drawings, wherein similar numerals of reference are employed to indicate corresponding parts in the views, the numeral 1 designates the running-gear of a wagon, which, as shown, has a coupling-pole 2 and a tongue 3.

To the rear wheels 4 is applied a brake consisting of a brake beam or rod 5, carrying brake-shoes 6 at the outer ends thereof. The said brake beam or rod 5 is movably suspended from a cross-strip 7 by links 8, the said cross-strip being supported on hounds 9. The brake beam or rod also has attached thereto a pair of rods 10, having hooks at their rear ends movably attached to the depending angularly-bent ends 11 of a rock-shaft 12, mounted in bearings 13, secured to the inner side of the rear bolster. Depending from the rock-shaft 12 are a pair of arms 14, and extending therefrom are links 15, having rear hooked ends 16 loosely engaging the lower ends of the arms 14. The said links have eyes or loops 17 in the body thereof, and secured thereto are the rear ends of connecting-rods 18, the said rear ends of the connecting-rods being similarly formed with loops, to the foremost of which the front hooked ends of the links 15 are detachably connected. The extreme rear ends of the connecting-rods are formed with hooks to engage the rearmost loops of the said links, and in the intermediate loops of the said parts suitable connecting devices or bolts may be positioned, and by this means a rigidity of connection of the several parts is attained of a strong and durable nature and reinforced against breakage. The front ends of the connecting-rods 18 are looped or formed with eyes 19 and are removably attached to the rear ends of rods 20, which movably engage a center rod 21 and bear against a coiled spring 23 thereon to take up the movement of the running-gear and to cushion the backward automatic adjustment of the parts without jamming. The front end of the central rod is movably held at the center of a cross pin or bolt $23^a$, carried in the rear end of a clevis 24, and on the said pin or bolt $23^a$, on opposite sides of the center rod, coiled springs 25 are mounted to cushion the said rods, and these devices compensate for turning movements of the vehicle. The clevis is located in and movable through a slot 26 in the front bolster, and to the front portion thereof are movably attached a pair of rods 27, which extend forwardly under the tongue and are loosely attached at their outer ends to a ring 28, movably but inseparably mounted on the front portion of the said tongue. The said ring 28 is held against disengagement from the end of the tongue by a chain 29, and thereto is attached one end of each of the stay-chains 30, the opposite ends of said chains being attached to a ring 31, movable on inclined guides 32, consisting of strap metal placed over the end of the tongue and securely bolted down and elevated toward the rear. The stay-chains 30 intermediate of their ends have S-hooks 33 secured thereto for attachment to the proper portion of the harness. The chain 29 is carried up over the top of the tongue and has attached thereto the front end of an adjusting-rod 34, having a rear angularly-bent end adapted to engage either one of a number of eyes 36 for regulating the movement of the ring 28. The rod 34 is adapted to slide in guides 35 and 37, and when engaged with one of the rear eyes 36 serves to hold the brake-shoe out of action in backing the vehicle by preventing the ring 28 from moving back sufficiently far to allow the application of the brake-shoe.

In operation the backward pull of the draft-animals in descending a grade is imparted through the stay-chains 30 to the ring 28 and the rods 27, and from the latter through the clevis 24 to the central rod 21 and transmitted to the rods 20, and from thence to the connecting-rods 18, and through the attachments set forth to the rock-shaft 12, which will operate the latter in such manner as to draw the depending ends 11 thereof backwardly through the arms 14 and move the brake beam or rod to the rear end, and thereby press the brake-shoes upon the wheels. When a level is reached, the spring 22 on the central rod automatically restores the parts to their normal position, which is permitted through a cessation of the pulling action on the ring 28.

The rods are adapted to be separated at the center to compensate for the adjustment of an extension of the running-gear of the wagon. The said rods may of themselves be supplied with extensions to accommodate this operation.

By the means set forth it will be seen that the animals control the braking of the wagon in an exceptionally convenient and positive manner, and the power applied will be considerably greater than could be acquired by a driver or teamster.

The animals attached to a vehicle embodying this brake soon become familiar with its operation and will learn to apply the brake properly at different times without the assistance of the driver or teamster.

It is obviously apparent that many minor changes in the details of construction and arrangement of the several parts might be made and substituted for those shown and described without in the least departing from the nature or spirit of the invention.

Having thus described the invention, what is claimed as new is—

1. The combination with the running-gear of a wagon, of brake mechanism, rods extending from the brake mechanism forwardly to the front of the pole, a movable ring mounted on the front of the pole and to which said rods are attached, inclined guides on the pole, and a stay-chain connected to said guides and ring, substantially as and for the purpose specified.

2. The combination with the running-gear of a wagon, of brake mechanism, including brake-chains, rods connected to the brake mechanism and extending forwardly to the pole, a ring movably engaging the front end of the pole and to which said rods are connected, inclined guides on the pole, stay-chains attached to said ring and guides and adapted to be connected to harness, and means for limiting the movement of the ring to permit backing of the vehicle, substantially as described.

3. The combination with the running-gear of a wagon, of brake mechanism, rods connected therewith and extended forwardly to the front end of the pole, a ring movably engaging said front end of the pole to which said rods are attached, a chain connected to said ring, means for adjusting said chain and ring, and stay-chains attached to said ring and adapted to be connected to harness, substantially as described.

4. The combination with the running-gear of a wagon, of the brake beam or rod having brake-shoes thereon, a rock-shaft connected to said brake-beam, rods attached to pendent arms on said rock-shaft, a ring movably engaging the front end of the pole and to which the front ends of said rods are connected, a stay-chain connected to said ring, and means for suspending said stay-chain separate from said pole-ring, substantially as described.

5. The combination with the running-gear of a wagon, of a rock-shaft 12 having pendent arms secured to the brake-beam by suitable connecting-rods, pendent lever-arms 14, rods extending from said lever-arms, and having their forward portions connected with a ring sliding on the front end of the pole, stay-chains connected with said ring, pendent chains connected with said stay-chains and movable on angle-irons connected with the pole, and means connected with said pole-ring for limiting its throw for preventing the application of the brakes in backing the vehicle, substantially as described.

In testimony whereof I have signed this specification in the presence of two subscribing witnesses.

JOHN R. KINKADE.

Witnesses:
WM. H. SPRIGG,
M. L. DYER.